United States Patent [19]

McPherson

[11] Patent Number: 5,413,971
[45] Date of Patent: May 9, 1995

[54] LASER ABSORBING FILTER GLASS

[76] Inventor: Donald M. McPherson, 6018 Colby St., Oakland, Calif. 94618

[21] Appl. No.: 121,015

[22] Filed: Sep. 14, 1993

[51] Int. Cl.[6] .............................................. C03C 3/068
[52] U.S. Cl. ...................................... 501/78; 501/79; 252/582; 252/587
[58] Field of Search .................. 501/78, 74, 75, 76, 501/79, 64; 252/582, 587

[56] References Cited

U.S. PATENT DOCUMENTS

| | | | |
|---|---|---|---|
| 3,971,723 | 7/1976 | Tajima et al. | 252/62.51 |
| 4,106,857 | 8/1978 | Snitzer | 350/311 |
| 4,288,250 | 9/1981 | Yamashita | 501/78 |
| 4,521,524 | 6/1985 | Yamashita | 501/64 |
| 4,769,347 | 9/1988 | Cook et al. | 501/64 |
| 5,039,631 | 8/1991 | Krashkevich et al. | 501/64 |

OTHER PUBLICATIONS

Volf, *Chemical Approach to Glass*, p. 351, 1984.

Primary Examiner—Mark L. Bell
Assistant Examiner—Deborah Jones

[57] ABSTRACT

Rare earth ions with partially filled 4f electron shells are incorporated in an amount of up to 39 mole percent oxide into a glass consisting essentially of, in mole percent, 19–31% $SiO_2$, 19–31% $B_2O_3$, 10–20% $Al_2O_3$, 2–10% amounts of $SiO_2$ and $B_2O_3$ should be greater than about 40%, and the amounts of $Al_2O_3$, $ZrO_2$ and $Y_2O_3$ are greater than about 12%. The glass can also include about 0.1 to 5% mole percent of FeO, ZnO or both. Suitable rare earth ions include but are not limited to, $Er^{3+}$, $Nd^{3+}$, $Dy^{3+}$, and $Sm^{3+}$. Optionally, the glass can be color corrected to neutral for a wide range of illuminant sources by the addition of one or more of the following: $Cr_2O_3$, $Pr_2O_3$, $Fe_2O_3$, CuO, NiO, $V_2O_5$, $Co_3O_4$ or $Ti_2O_3$. These glass compositions are useful as absorption filters. In one embodiment, the composition selectively absorbs at 1064 and 532 nm.

40 Claims, 6 Drawing Sheets

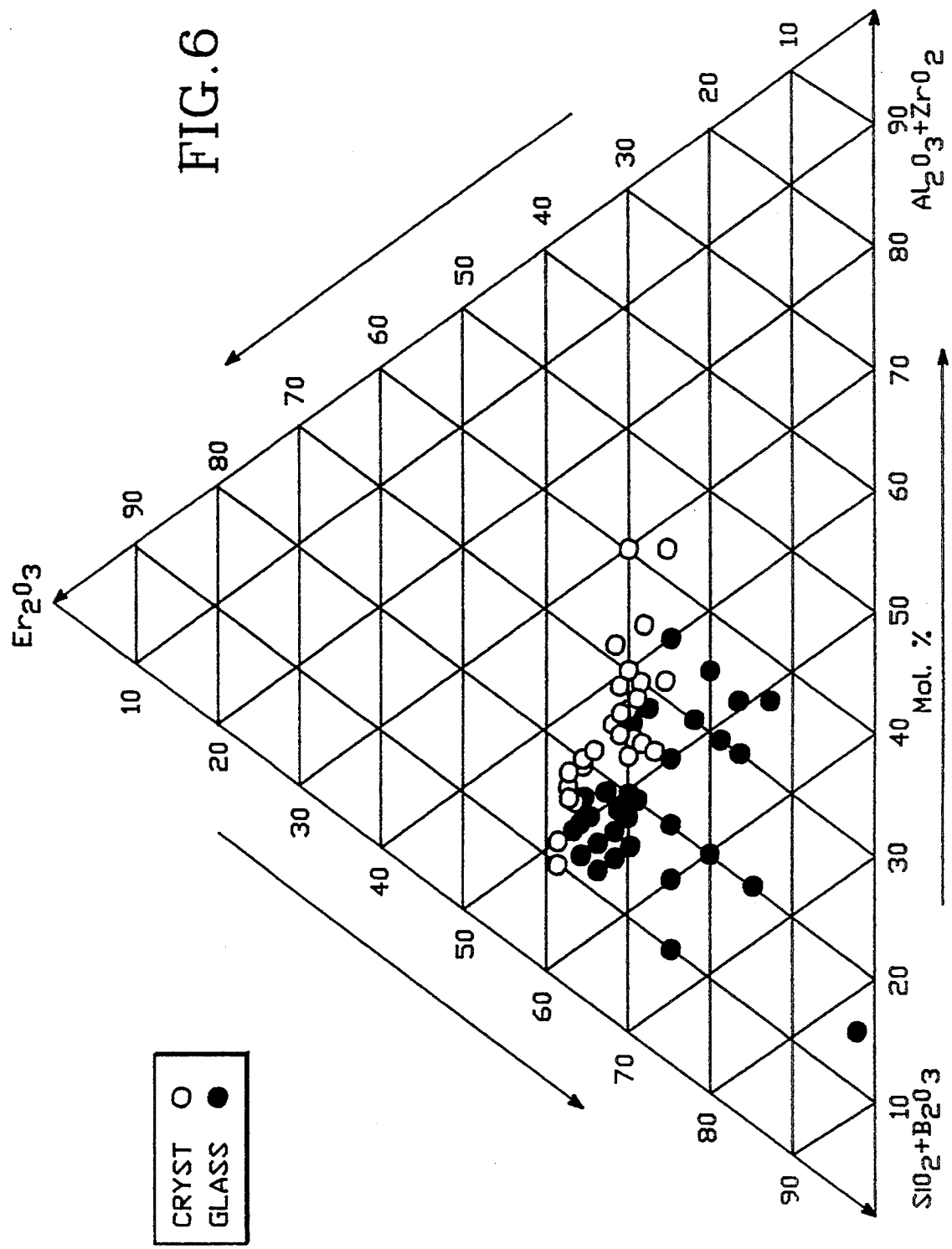

5,413,971

LASER ABSORBING FILTER GLASS

BACKGROUND OF THE INVENTION

This invention relates generally to glass compositions employing one or more rare earth ions, and more particularly, to absorption filters which selectively absorb at 532 nm, 1064 nm or both.

The eye's response to light, its photopic response, is most sensitive in the green region of the visible spectrum. This response is at its maximum at around 550 nm. The eye's sensitivity decreases moving towards the red or blue regions of the spectrum.

Eyewear has been developed and is worn to protect the eye from damage from laser light. For years, there have been problems with eyewear designed for lasers which emit light in the green region of the spectrum. Eyewear available to date have tended to suffer from numerous problems including, (i) suppression of photopic transmission, (ii) low optical density, (iii) color distortion resulting from the need for a broad acceptance angle, and (iv) problems with color balancing. Color balancing has proven to be difficult partially because of the eye's photopic response.

Various glasses have been employed for laser protective eyewear. These glasses have utilized a variety of different compositions.

Rare earth oxides have been incorporated into glass for the purpose of wavelength selective filters, or for narrow pass filters. In U.S. Pat. No. 4,106,857, an optical filter is disclosed which incorporates a rare earth as one of the glass constituents.

As the amount of rare earth oxide in the filter increases, there is an increase in the optical density, Consequently, with lower concentrations, the thickness of the optical element must increase for effective eye protection. It has been difficult to obtain higher concentrations, with the glass remaining stable with regard to devitrification.

However, the use of rare earth oxides in glass has been limited to no more than 25-30 mole percent. In U.S. Pat. No. 3,971,723, a glass incorporating $Tb_3O_2$ as one of the constituents has been reported. These glasses do not absorb at any useful laser wavelength, particularly in the visible or in the infrared.

There have been difficulties incorporating rare earth ions in higher concentrations, particularly for glass systems made in commercial quantities. Those rare earth glass systems employed as filters have suffered the limitation in that they absorb at fixed wavelengths which are not necessarily the wavelength of interest. This is the result of their electron transitions, resulting from rearrangement of inner shell shielded 4f electrons, being fixed at specific energy levels. In glass hosts, minor shifts in position of only a few nanometers can be obtained. The sharpness of the transitions have been employed advantageously to prepare rare earth containing band pass filters.

Interference-type filters can be designed to absorb at selective wavelengths in well collimated light. A limitation is that they exhibit strong viewing angle dependence, making them unsuitable for many applications.

Absorption-type filters do not suffer from this limitation. Further, these filters can be designed to have excellent thermal, chemical and mechanical properties, as well as offering the possibility of prescription eyewear.

An immediate need exists for laser safety eyewear, such as an absorption-type filter, that is opaque at the lasing wavelength of Nd:YAG (1064 nm) and frequency doubled Nd:YAG (532 nm). Furthermore, these filters should have optical densities from 3.0 to 5.0 at practical thicknesses, and possess high luminous transmission with minimal color distortion.

SUMMARY OF THE INVENTION

Accordingly, it is an object of the invention to provide a rare earth oxide glass.

Another object is to provide a rare earth oxide glass with one or more rare earth oxides in an amount of up to 39 mole percent.

Yet another object of the invention is to provide an absorption filter which includes one or more rare earth oxides in a glass host.

Still a further object of the invention is to provide an absorption filter which selectively absorbs at 1064 and 532 nm.

Another object of the invention is to provide a glass, doped with one or more rare earth oxides, which acts to favorably shift selected wavelengths.

In one embodiment, the glass is a wavelength selective absorption-type filter and is used for protection against laser radiation at 1064 nm and 532 nm. The glass is composed essentially of, in mol percent, 19-31% $SiO_2$, 19-31% $B_2O_3$, 10-25% $Al_2O_3$, 0-10% $ZrO_2$, 0-10% $Y_2O_3$, 25-39% of one or more rare earth oxides, where the rare earths are selected from the group $Er^{3+}$, $Nd^{3+}$, $Dy^{3+}$, $Sm^{3+}$, $Ce^{3+}$, $Pr^{3+}$, $Ho^{3+}$, $Yb^{3+}$ and $Tm^{3+}$. In another embodiment, the glass can include about 0.1 to 5 mole percent of ZnO, FeO or both. Color correction can be achieved with the addition of one or more of the following oxides, $Pr_2O_3$, $Cr_2O_3$, $Fe_2O_3$, CuO, NiO, $Co_3O_4$, $V_2O_5$, $Ti_2O_3$.

Glass compositions of the invention can be employed as absorption type filters, which in turn can be used in laser protective eyewear. In one embodiment, the filter selectively absorbs at 532 nm, and may also absorb at 1064 nm. The composition of the glass is such that an optical density of greater than 3 at these wavelengths can be realized, in a filter having a thickness of about 1.5 up to 3.5 mm.

BRIEF DESCRIPTION OF THE DRAWINGS

FIG. 6 illustrates the region of glass formation in the ternary system, glass former ($SiO_2 + B_2O_3$), glass modifier ($Al_2O_3 + ZrO_2$) and rare earth ($Er_2O_3$).

DETAILED DESCRIPTION OF THE PREFERRED EMBODIMENTS

Figure 1:
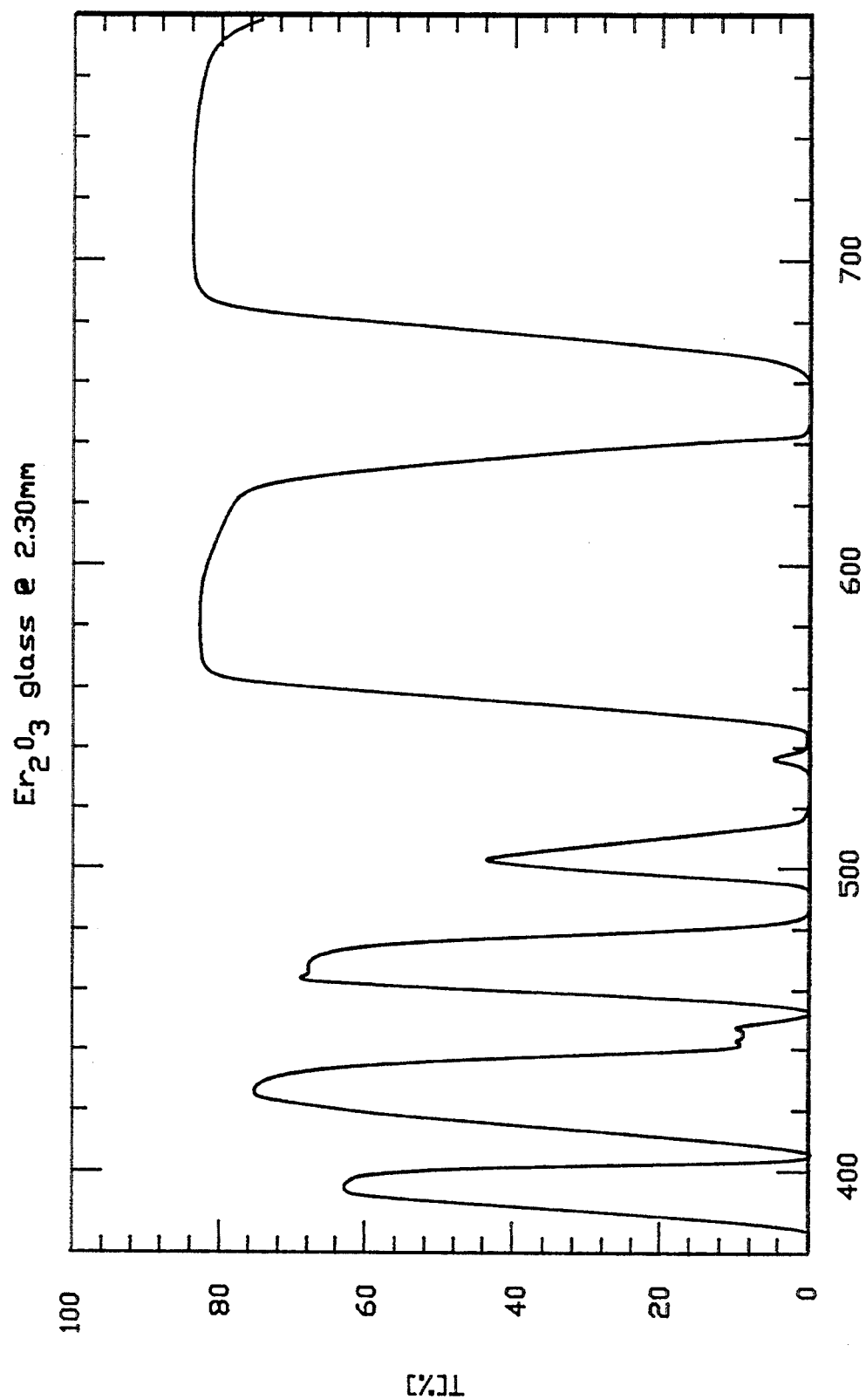
FIG. 1 is a transmission curve of an $Er^{3+}$ glass containing 36 mole percent $Er_2O_3$. The glass has a thickness of 2.3 mm and an optical density at 532 of 4.0.
Figure 2:
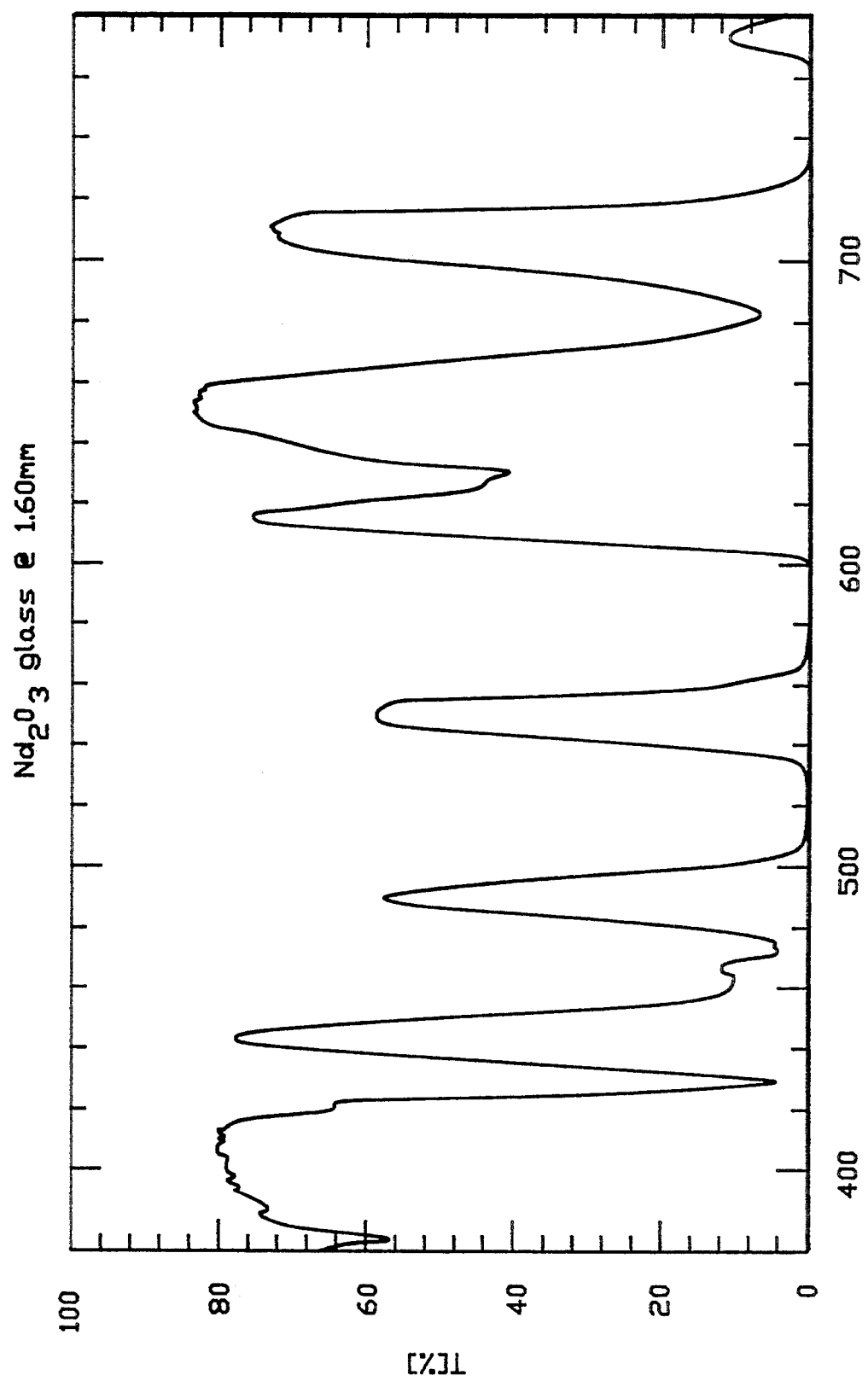
FIG. 2 is a transmission curve of a $Nd^{3+}$ glass containing 34 mole percent $Nd_2O_3$. The glass has a thickness of 1.6 mm and an optical density at 532 nm of 4.0.
Figure 3:
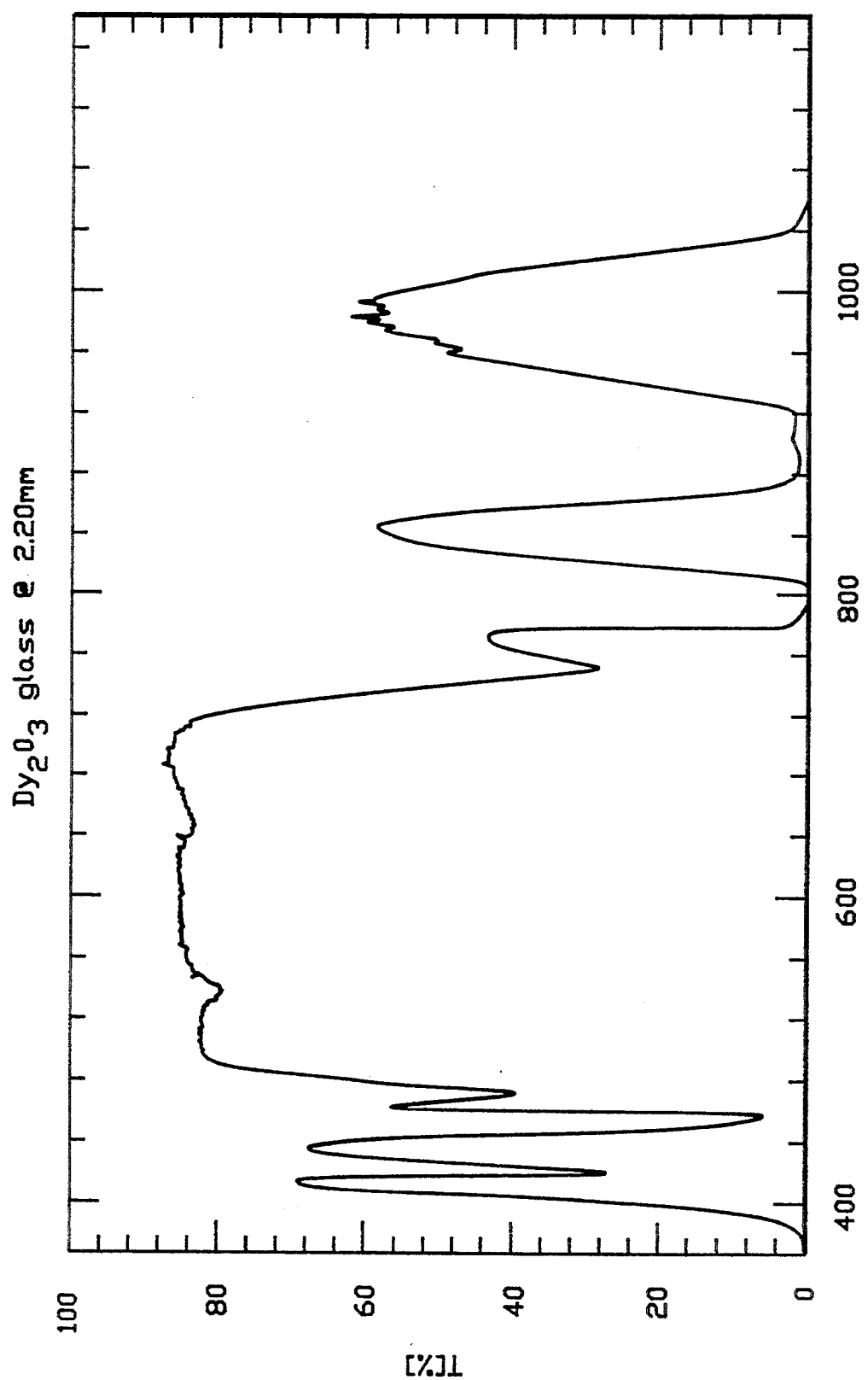
FIG. 3 is a transmission curve of a $Dy^{3+}$ glass containing 35 mole percent $Dy_2O_3$. The glass has a thickness of 2.5 mm and an optical density at 532 nm of 4.0.
Figure 4:
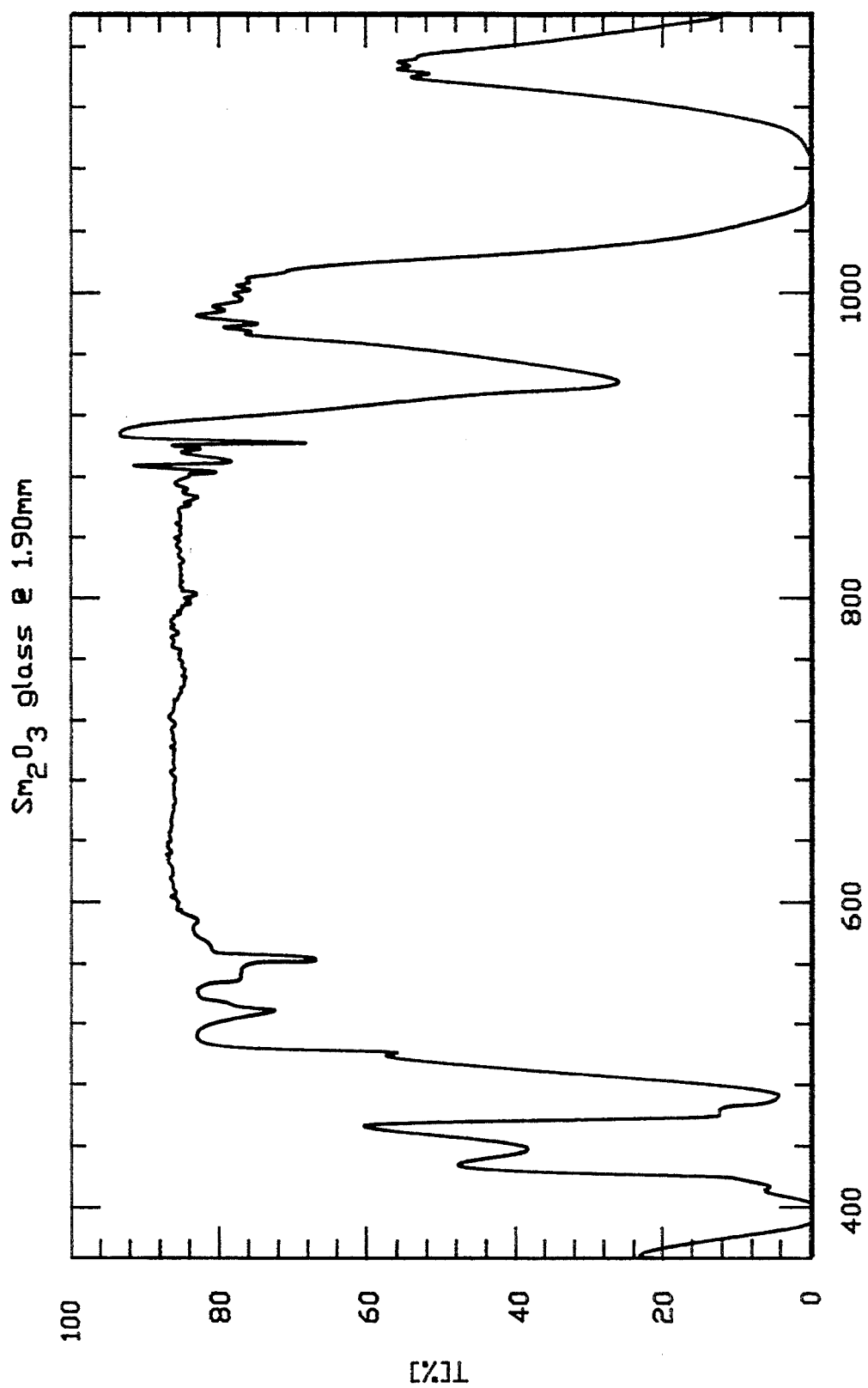
FIG. 4 is a transmission curve of a $Sm^{3+}$ glass containing 35 mole percent $Sm_2O_3$. The glass has a thickness of 1.8 mm and an optical density at 532 nm of 4.0.

In one embodiment of the present invention, a glass composition is provided which consists essentially of, in mol percent, 19-31% $SiO_2$, 19-31% $B_2O_3$, 10-25% $Al_2O_3$, 0-10% $ZrO_2$, 0-10% $Y_2O_3$ and 25-39% of one or more rare earth oxides, where the rare earth oxides are selected from, $Er^{3+}$, $Nd^{3+}$, $Dy^{3+}$, $Sm^{3+}$, $Ce^{3+}$, $Pr^{3+}$, $Ho^{3+}$, $Yb^{3+}$ and $Tm^{3+}$. This glass is suitable for use as a wavelength selective absorption type filter for protection against laser radiation at 1064 nm and 532 nm. Color correction can be achieved with the inclusion of one or more the following oxides: $Pr_2O_3$, $Cr_2O_3$, $Fe_2O_3$, $CuO$, $NiO$, $Co_3O_4$, $V_2O_5$ and $Ti_2O_3$. The glass can also optionally include, in mole percent, about 0.1 to 5% $ZnO$, $FeO$ or both.

With the present invention, up to 39 mole percent of one or more rare earth oxides can be incorporated into the glass composition. More preferably, the rare earth oxides are about 31 to 39 mole percent. In one embodiment, the glass composition includes up to 37 mole percent $Er_2O_3$. In another embodiment, up to 39 mole percent $Nd_2O_3$ is included. In yet a further embodiment, up to 39 mole percent $Dy_2O_3$ is included. In another embodiment, up to 38 mole percent $Sm_2O_3$ is incorporated in the glass composition. The composition is a borosilicate glass. Glass of the present invention are useful as filters for absorbing at laser wavelengths, particularly in the visual or in the infrared. Additionally, they can be made in commercial quantities. As filters, the glasses of the present invention have optical densities of about 3.0 to 6.0, and thickness of about 1.5 to 5.5 mm.

The amount of the color correction oxide included in the glass is dependent on, (i) the source of illumination, amount and type of rare earth oxide(s) present, (iii) filter thickness, and (iv) optical density.

Essential to the employment of $Er^{3+}$ as the absorbing species at 532 nm is the discovery that under certain compositional constraints a shift in the $^2H_{11/2}$ energy level of $Er3+$ from about 522 nm to as long as 531.2 nm occurs. This permits a practical filter thicknesses of about 2.0-3.5 mm to be realized for optical densities from 3.0-6.0, while retaining luminous transmissions greater than 50%. Very little shift in the $^4G_{7/2}$ energy level of $Nd^{3+}$ located at about 529 nm is observed with the composition, but the broadening of the absorption band is sufficient to give optical densities greater than 6.0 at 532 nm with luminous transmission ranging from 15-30% for a section 2.1 mm thick.

Six transitions associated with the $^6H_{7/2}$ energy level of $Dy^{3+}$ from 1066.1-1110.2 nm are smeared into a broad band centered at 1083 nm. The resulting optical element has an optical density at 1064 nm greater than 4.0 with luminous transmission greater than 80% for a section 2.2 mm thick. The transitions associated with the $^6F_{9/2}$ energy level of $Sm^{3+}$ are smeared into a broad band centered around 1074 nm. The resulting optical element has an optical density at 1064 nm greater than 4.0 with luminous transmission greater than 75% for a section 1.8 mm thick. Transmission curves for glasses containing high percentage of the rare earth oxides are given in FIGS. 1-4.

The concentration of $Er_2O_3$ in the glass is about 25-38 mole percent. Preferably, the concentration is greater than about 30 but does not exceed 38 mole percent. More preferably, the concentration is about 37 mole percent or less. Below 25 mole percent, insufficient shift and broadening of the $^2H_{11/2}$ energy level absorption band occurs. Above 37 mole percent $Er_2O_3$, the glass is unstable with respect to devitrification.

Concentration of the $Nd_2O_3$ in the glass is about 25 to 39 mole percent. Preferably, it is greater than about 30 but does not exceed 39 mole percent. Below 25 mole percent, insufficient broadening of the $^4G_{7/2}$ energy level absorption band occurs. Above 39 mole percent $Nd_2O_3$, the glass is unstable with respect to devitrification.

Concentration of the $Dy_2O_3$ in the glass is about 25 to 39 mole percent. Preferably, it is greater than 30 but does not exceed 39 mole percent. Below 25 mole percent, insufficient broadening of the $^6H_{7/2}$ energy level absorption band occurs. Above 39 mole percent $Dy_2O_3$, the glass is unstable with respect to devitrification.

The concentration of the $Sm_2O_3$ in the glass is about 25 to 38 mole percent. Preferably, the concentration is greater than 30 but does not exceed 38 mole percent. More preferably, the concentration is 38 mole percent or less. Below 25 mole percent, insufficient broadening of the $^6F_{9/2}$ energy level absorption band occurs. Above 38 mole percent $Sm_2O_3$, the glass is unstable with respect to devitrification.

Figure 5A:
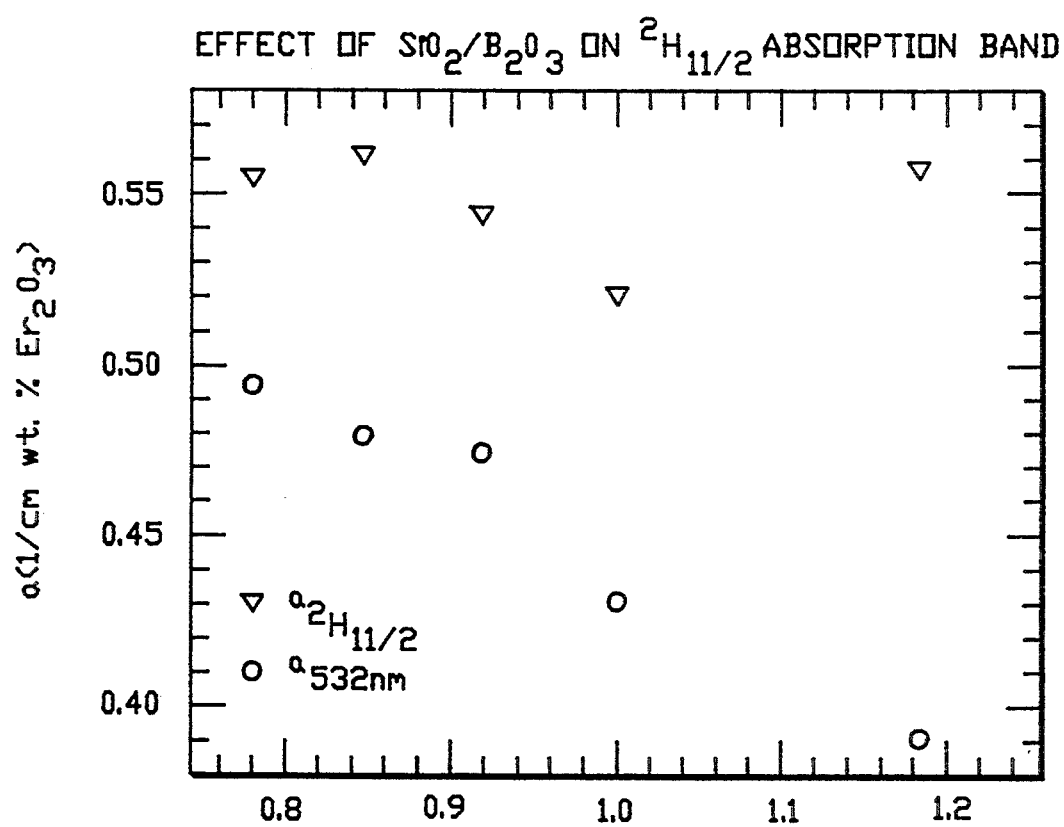
FIGS. 5a and 5b illustrate the effect of $SiO_2/B_2O_3$ on the wavelength of the $^2H_{11/2}$ transition of $Er^{3+}$, and the absorption coefficient at 532 nm.
Figure 5B:
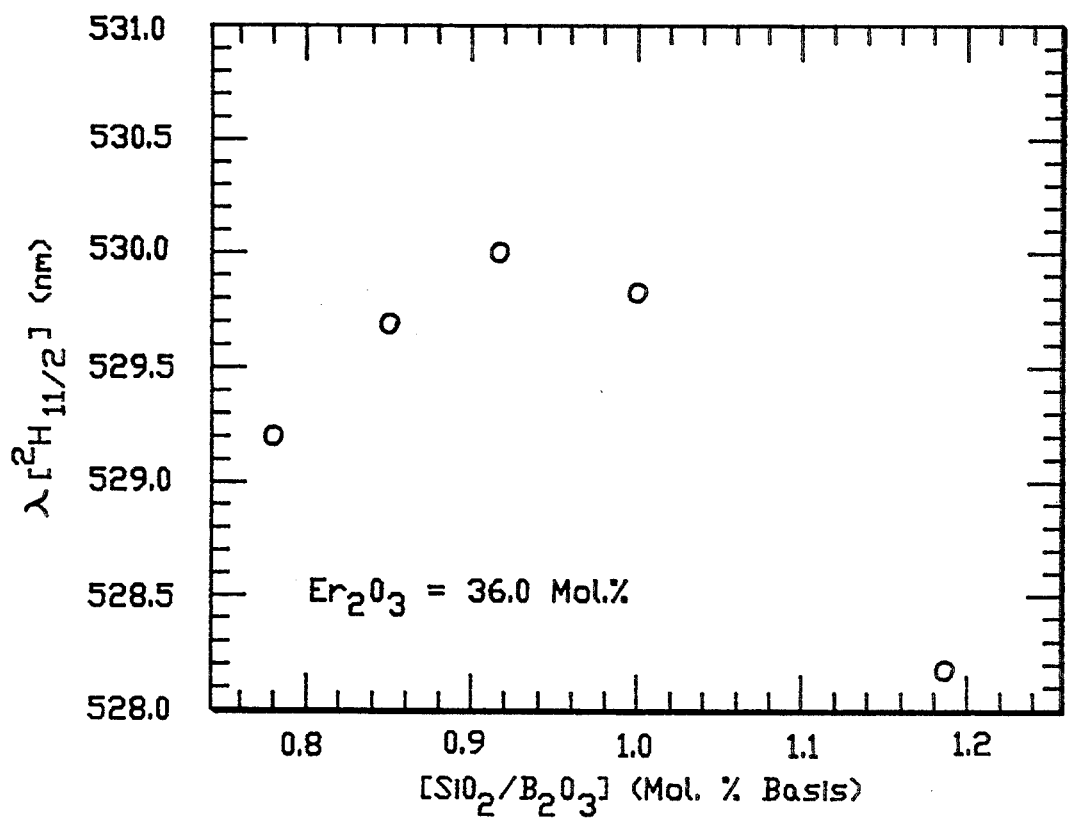

In order to allow sufficient solubility of the rare earth ion, the ratio of glass formers, $SiO_2$ and $B_2O_3$, is maintained between about 0.8 to 1.4. The total of $SiO2$ and $B2O3$ in the glass is about 40-65 mole percent. The absorption band associated with the $^2H_{11/2}$ energy level of $Er^{3+}$ is shifted in position, intensity and sharpness as a function of $SiO_2/B_2O_3$. As a consequence, the absorption at 532 nm is strongly affected. This trend is shown in FIG. 5.

Sufficient amounts of $Al_2O_3$ and $ZrO_2$ are added to lower the liquidus temperature and increase the viscosity at the liquidus temperature. The total of $Al_2O_3+ZrO_2$ in the glass is about 12-30 mole percent. $Y_2O_3$ can be incorporated in place of $Al_2O_3$ and $ZrO_2$ up to about 12 mole percent. This, however, tends to limit the solubility of the rare earth ion to approximately 30 mole percent. The incorporation of $Y_2O_3$ shifts the $^2H_{11/2}$ energy level of $Er^{3+}$ to longer wavelengths (531.2 nm), and sharpens the absorption band considerably.

FIG. 6 shows the region of glass formation in the ternary system consisting of, glass former ($SiO_2+B_2O_3$), glass modifier ($Al_2O_3+ZrO_2$) and rare earth ($Er_2O_3$).

Oxides of the alkali and alkali-earths can be incorporated in the glass composition. It is desirable to remove substantially all unnecessary components from the glass to make as much room as possible for the rare earth ions.

Four methods exist for suppression at 1064 nm, (i) interference coatings, (ii) ferrous iron incorporated into an alumino-phosphate glass, (iii) ferrous iron incorporated into the rare earth borosilicate glass, and (iv) using the rare earth oxides of $Dy^{3+}$ or $Sm^{3+}$ in the host borosilicate glass.

It is advantageous to incorporate a mechanism for absorption at 532 nm with a mechanism for absorption at 1064 nm. Table I lists fourteen possible combinations of mechanisms.

If FeO is incorporated into the rare earth borosilicate glass, ZnO is added to prevent the formation of FeS, the tendency to form ZnS, which is colorless, being more favorable than the tendency to form FeS, which is dark brown. ZnO can be incorporated up to about 5 mole percent without difficulty, but about 1-2 mole percent is preferable. To maintain high luminous transmission, a high value of $SiO_2/B_2O_3$ is desirable, resulting in a shift of the broad infrared absorption band of the ferrous ion to longer wavelengths and an intensification of the absorption at 1064 nm. The result is a need for less FeO addition. FeO can readily be incorporated in an amount of about 0.1 to 5 mole percent, but a range of about 1.8–2.3 mole percent is desirable to give similar values of optical density at 532 nm (from $Er^{3+}$ or $Nd^{3+}$) and 1064 nm (from the ferrous ion).

METHOD FOR MAKING GLASS

The borosilicate glass of the invention can be prepared using conventional glass making techniques. See, for example *Silicate Glass Technology Methods*, Babcock, C., John Wiley & Sons, 1977, Chapter 19, incorporated herein by this reference. The glasses are made in commercial quantities, greater than one liter. Starting materials can be oxides, carbonates or nitrates. The raw materials are mixed and fired in platinum or alumina crucibles at about 1450°–1500° C. for several hours, bubbled with argon, nitrogen or oxygen, or stirred to promote good homogeneity. They are then cast at about 1350°–1420° C. In the case of the FeO containing rare earth borosilicate glass, the $Fe^{2+}$ can be added as ferrous oxalate, magnetite or ferric oxide. Reduction is carried out by bubbling a reducing gas through the melt and maintaining a reducing or neutral atmosphere. It is necessary to prevent the over reduction of the ferrous ion to the metallic iron, as this imparts a grey turbidity to the glass and can act as nucleation site for crystallization from the melt. It is equally important to maintain as low of a concentration of ferric ions in the melt because the ferric ion absorbs strongly in the visible. The temperature of the melt, and the partial pressure of oxygen in and above the melt, determine the ratio of the ionic specie, $Fe^{\circ}/Fe^{2+}/Fe^{3+}$.

These glasses are characterized by excellent chemical durability in water, acids and bases. $SiO_2$, $ZrO_2$, and ZnO improve durability in acids. $B_2O_3$, $Al_2O_3$ and ZnO improve durability in water. $ZrO_2$ and ZnO improve durability in bases. They possess high hardness, $T_g$ greater than 760° C., expansion coefficients less than $45 \times 10^{-7}/°C.$, and high refractive indices, approximately 1.73. They are not susceptible to radiation bleaching.

Table I is a summary of color balancing certain rare earth glass compositions of the invention.

TABLE I

MECHANISMS FOR ABSORBING AT 532/1064 IN A SINGLE OPTICAL ELEMENT

| METHOD | ELEMENTS | IONS FOR COLOR CORRECTION |
|---|---|---|
| 1. | $Er^{3+}$ + dielectric coating | $Cu^{2+}$ + ($Pr^{3+}$, $Cr^{3+}$, $Fe^{3+}$) |
| 2. | $Er^{3+}$ + FeO glass (laminated) | ($Pr^{3+}$, $Cr^{3+}$, $Fe^{3+}$) |
| 3. | $Er^{3+}$/FeO glass | ($Pr^{3+}$, $Cr^{3+}$, $Fe^{3+}$) |
| 4. | $Nd^{3+}$ + dielectric coating | ($Ni^{2+}$, $Pr^{3+}$, $Cr^{3+}$, $Fe^{3+}$) |
| 5. | $Nd^{3+}$ + FeO glass (laminated) | ($Ni^{2+}$, $Pr^{3+}$, $Cr^{3+}$, $Fe^{3+}$) |
| 6. | $Nd^{3+}$/FeO glass | ($Ni^{2+}$, $Pr^{3+}$, $Cr^{3+}$, $Fe^{3+}$) |
| 7. | $Er^{3+}$ + $Dy^{3+}$ (laminated) | $Cu^{2+}$ + ($Pr^{3+}$, $Cr^{3+}$, $Fe^{3+}$) |
| 8. | $Er^{3+}$/$Dy^{3+}$ glass | $Cu^{2+}$ + ($Pr^{3+}$, $Cr^{3+}$, $Fe^{3+}$) |
| 9. | $Er^{3+}$ + $Sm^{3+}$ (laminated) | $Cu^{2+}$ + ($Pr^{3+}$, $Cr^{3+}$, $Fe^{3+}$) |
| 10. | $Er^{3+}$/$Sm^{3+}$ glass | $Cu^{2+}$ + ($Pr^{3+}$, $Cr^{3+}$, $Fe^{3+}$) |
| 11. | $Nd^{3+}$ + $Dy^{3+}$ (laminated) | not required |
| 12. | $Nd^{3+}$/$Dy^{3+}$ glass | not required |
| 13. | $Nd^{3+}$ + $Sm^{3+}$ (laminated) | $Cu^{2+}$ + ($Pr^{3+}$, $Cr^{3+}$, $Fe^{3+}$) |
| 14. | $Nd^{3+}$/$Sm^{3+}$ glass | $Cu^{2+}$ + ($Pr^{3+}$, $Cr^{3+}$, $Fe^{3+}$) |

Table II summarizes different glass compositions of the present invention with $Er_2O_3$ present as the rare earth oxide. Each melt size was about 50 to 150 g. Constituents are expressed in mole percent. The glass did not exhibit visible crystallization upon casting.

TABLE II $ER_2O_3$ GLASSES

| $Er_2O_3$ | $SiO_2$ | $B_2O_3$ | $Al_2O_3$ | $ZrO_2$ | ZnO | GLASS/XTAL |
|---|---|---|---|---|---|---|
| 35. | 25. | 23. | 13. | 3. | 1. | GLASS |
| 36. | 25. | 23. | 11. | 5. | 0 | GLASS |
| 36. | 25. | 25. | 11. | 3. | 0 | GLASS |
| 36. | 26. | 26. | 10. | 2. | 0 | GLASS |
| 36. | 24. | 24. | 11. | 5. | 0 | GLASS |
| 36. | 23. | 25. | 11. | 5. | 0 | GLASS |
| 36. | 22. | 26. | 11. | 5. | 0 | GLASS |
| 36. | 21. | 27. | 11. | 5. | 0 | GLASS |
| 36. | 26. | 22. | 11. | 5. | 0 | GLASS |
| 36. | 26. | 22. | 13. | 3. | 0 | GLASS |
| 36. | 28. | 20. | 11. | 5. | 0 | GLASS |
| 36. | 28. | 20. | 13. | 3. | 0 | GLASS |
| 37. | 22. | 24. | 15. | 3. | 0 | GLASS |
| 37. | 21.5 | 23.5 | 16. | 2. | 0 | GLASS |
| 37. | 22.5 | 24.5 | 13. | 1. | 2. | GLASS |

Table III provides a summary of transmission data for various $Er_2O_3$ glasses. Each composition is expressed in mole percent. Transmission values are reported for the 532 nm wavelength, at an optical density of 4.0.

TABLE III

TRANSMISSION DATA FOR $Er_2O_3$ GLASS COMPOSITIONS

| $Er_2O_3$ | $SiO_2$ | $B_2O_3$ | $Al_2O_3$ | $ZrO_2$ | $Y_2O_3$ | $^2H_{11/2}$ | $t_{min}$ | $Y_A$ | $Y_{D65}$ | $Y_{F3}$ | $Y_{F11}$ |
|---|---|---|---|---|---|---|---|---|---|---|---|
| 15.0 | 30.0 | 25.0 | 2.0 | 2.0 | (*) | 522.0 | >30.0 | (*) | −26.0 | | $R_2O$ |
| 17.3 | 31.5 | 19.3 | 1.8 | 1.5 | (*) | 526.0 | 8.74 | (*) | −28.6 | | $R_2O$ |
| 20. | 70. ($P_2O_5$) | | 5. (ZnO) | | 5. ($K_2O$) | 524.0 | 6.92 | 62.9 | 55.2 | 69.8 | 55.7 |
| 25. | 22.5 | 22.5 | 14.4 | 6. | 9.6 | 528.0 | 3.21 | 37.9 | 40.8 | 54.5 | 35.6 |
| 28. | 26. | 26. | 15. | 5. | 0 | 528.0 | 2.78 | 48.3 | 40.8 | 54.5 | 35.6 |
| 28. | 31. | 21. | 15. | 5. | 0 | 528.0 | 2.83 | 48.8 | 41.2 | 55.0 | 36.0 |
| 28. | 26. | 26. | 15. | 0 | 5. | 526.7 | 2.87 | 48.2 | 40.6 | 54.5 | 35.4 |
| 28. | 31. | 21. | 15. | 0 | 5. | 527.0 | 2.83 | 50.0 | 42.1 | 56.4 | 36.7 |
| 28. | 26. | 21. | 20. | 0 | 5. | 527.0 | 2.75 | 51.6 | 43.5 | 58.2 | 37.9 |
| 29.4 | 20.6 | 30.4 | 14.7 | 4.9 | 0 | 528.2 | 2.67 | 46.0 | 38.8 | 52.0 | 33.8 |
| 30. | 22.5 | 22.5 | 12. | 5. | 8. | 531.2 | 3.24 | 49.8 | 42.1 | 56.0 | 38.3 |
| 30. | 26. | 26. | 13. | 5. | 0 | 527.2 | 2.93 | 52.0 | 43.8 | 58.8 | 38.2 |
| 30. | 31. | 21. | 13. | 5. | 0 | 528.2 | 2.82 | 51.0 | 43.0 | 57.5 | 37.4 |
| 30. | 27. | 27. | 12. | 4. | 0 | 527.8 | 2.75 | 52.3 | 44.1 | 59.0 | 38.5 |
| 32. | 26. | 26. | 12. | 4. | 0 | 528.0 | 2.71 | 51.1 | 43.0 | 57.7 | 37.5 |
| 34. | 26. | 26. | 11. | 3. | 0 | 528.0 | 2.47 | 51.6 | 43.4 | 58.2 | 37.8 |

TABLE III-continued

TRANSMISSION DATA FOR ER₂O₃ GLASS COMPOSITIONS

| $Er_2O_3$ | $SiO_2$ | $B_2O_3$ | $Al_2O_3$ | $ZrO_2$ | $Y_2O_3$ | $^2H_{11/2}$ | $t_{min}$ | $Y_A$ | $Y_{D65}$ | $Y_{F3}$ | $Y_{F11}$ |
|---|---|---|---|---|---|---|---|---|---|---|---|
| 34. | 27. | 27. | 10. | 2. | 0 | 529.8 | 2.46 | 52.2 | 44.0 | 58.9 | 38.3 |
| 35. | 25. | 23. | 13. | 3. | 1. | 530.2 | 2.52 | 50.9 | 42.4 | 57.2 | 36.9 |
| 35. | 24. | 26. | 13. | 2. | 0 | 528.2 | 2.45 | 52.4 | 44.3 | 59.0 | 38.4 |
| 35. | 23. | 25. | 15. | 2. | 0 | 527.8 | 2.57 | 52.1 | 44.0 | 58.8 | 38.2 |
| 36. | 25. | 25. | 11. | 3. | 0 | 529.2 | 2.31 | 51.4 | 43.4 | 57.9 | 37.9 |
| 36. | 26. | 26. | 10. | 2. | 0 | 530.0 | 2.34 | 51.3 | 43.1 | 57.8 | 37.6 |
| 36. | 24. | 24. | 11. | 5. | 0 | 529.8 | 2.45 | 49.6 | 41.6 | 56.1 | 36.2 |
| 36. | 23. | 25. | 11. | 5. | 0 | 530.0 | 2.29 | 49.9 | 41.8 | 56.2 | 36.3 |
| 36. | 22. | 26. | 11. | 5. | 0 | 529.7 | 2.21 | 51.5 | 43.2 | 57.9 | 37.5 |
| 36. | 21. | 27. | 11. | 5. | 0 | 529.2 | 2.32 | 51.4 | 43.2 | 57.8 | 37.4 |
| 36. | 26. | 22. | 11. | 5. | 0 | 527.4 | 2.21 | 52.2 | 44.1 | 58.6 | 38.1 |
| 36. | 26. | 22. | 13. | 3. | 0 | 528.2 | 2.62 | 51.8 | 43.6 | 58.3 | 37.7 |
| 37. | 22.5 | 24.5 | 13. | 1. | 2. [ZnO] | 528.6 | 2.11 | 53.0 | 45.0 | 59.8 | 39.1 |

Tables IV-A and IV-B summarize color correction of certain Er₂O₃ glass compositions using different sources. The concentration of the constituents are in amounts sufficient to provide a neutral glass relative to a desired source. In Table IV-A, the color difference vector, r, is defined as:

$$r = \{(u' - u_s')^2 + (v' - v_s')^2\}^{\frac{1}{2}} \quad (1)$$

where (u',v') are the color coordinates of the filter, and (u$_s'$,v$_s'$) are the color coordinates of the incandescent source, $A_{3200K}$. The lower r is in magnitude, the more neutral the glass appears.

In Table IV-B, the luminous transmission is calculated for glasses with anti-reflective coatings. The color difference vector, r, is defined as:

$$r = \{(u' - u_s')^2 + (v' - v_s')^2\}^{\frac{1}{2}} \quad (2)$$

where (u',v') are the color coordinates of the filter, and (u$_s'$,v$_s'$) are the color coordinates of the fluorescent source, $F_{11}$.

TABLE IV-A

$Er^{3+}$ GLASS COLOR CORRECTED FOR SOURCE $A_{3200K}$

| | [wt %] | | | [values for $OD_{532nm} = 4.0$] | |
|---|---|---|---|---|---|
| RUN | CuO | $Cr_2O_3$ | $Pr_2O_3$ | Y (%) | r |
| C3 | 0 | 0 | 0 | 50.0 | 0.0756 |
| CC1 | 1.00 | 0.04 | 0 | 17.6 | 0.0245 |
| CC11 | 0.443 | 0.019 | 0 | 13.2 | 0.0185 |
| CC2 | 0.80 | 0.03 | 0 | 6.7 | 0.0066 |
| CC10 | 0.30 | 0 | 1.36 | 24.3 | 0.0381 |
| CC7 | 0.40 | 0 | 1.55 | 17.2 | 0.0180 |
| CC8 | 0.30 | 0 | 1.16 | 15.5 | 0.0172 |
| CC4 | 0.62 | 0 | 1.20 | 8.5 | 0.0063 |

TABLE IV-B

$Er^{3+}$ GLASS COLOR CORRECTED FOR SOURCE $F_3$

| | [wt %] | | [values for $OD_{532nm} = 4.0$] | |
|---|---|---|---|---|
| RUN | CuO | $Pr_2O_3$ | $Y_{AR}$ (%) | r |
| C3 | 0 | 0 | 64.9 | 0.0533 |
| CC21 | 0.048 | 7.00 | 44.9 | 0.0482 |
| CC26 | 0.096 | 4.20 | 47.7 | 0.0462 |
| CC23 | 0.048 | 14.00 | 34.9 | 0.0461 |
| CC22 | 0.096 | 7.00 | 42.4 | 0.0452 |
| CC47 | 0.144 | 4.20 | 45.0 | 0.0439 |
| CC27 | 0.192 | 4.20 | 42.5 | 0.0408 |
| CC31 | 0.192 | 5.60 | 40.1 | 0.0400 |
| CC33 | 0.240 | 7.00 | 35.8 | 0.0368 |
| CC30 | 0.288 | 4.20 | 38.0 | 0.0351 |
| CC35 | 0.288 | 7.00 | 33.8 | 0.0340 |
| CC34 | 0.288 | 8.40 | 32.1 | 0.0328 |
| CC37 | 0.384 | 5.60 | 32.1 | 0.0288 |
| CC44 | 0.432 | 7.00 | 28.7 | 0.0254 |
| CC40 | 0.480 | 4.20 | 30.5 | 0.0252 |

TABLE IV-B-continued

$Er^{3+}$ GLASS COLOR CORRECTED FOR SOURCE $F_3$

| | [wt %] | [values for $OD_{532nm} = 4.0$] | |
|---|---|---|---|
| RUN | CuO | $Pr_2O_3$ | $Y_{AR}$ (%) | r |
| CC45 | 0.384 | 9.80 | 24.6 | 0.0223 |

Various glass compositions of the invention were synthesized utilizing the method set forth above. As summarized in Table I, fourteen different combinations of components can be employed to yield optical elements suitable for absorption at both 532 nm and 1064 nm. These can include, for example, one or more rare earth oxides, a rare earth oxide with a dielectric coating, rare earth oxides and ions included for color balancing, rare earth oxides with FeO, and laminated structures. Additionally, a single wavelength can be blocked with the present invention. In the case of the 532 nm wavelength, $Er^{3+}$ or $Nd^{3+}$ are used; and $Dy^{3+}$ or $Sm^{3+}$ are employed for 1064 nm.

The following examples are glass compositions useful for absorption at 532 nm, 1064 nm or both. In each example, the luminous transmission was measured against the following sources:

A, B, C, D65, F2, F3, F7 and F11. CIE No.18 (E-1.2) 1970, *Principles of Light Measurement,* and ASTM Designation E308-85, *Standard Method for Computing the Colors of Objects by Using the CIE System,* both incorporated herein by reference.

The following examples of filter elements are made using the method for making glass recited above.

EXAMPLE I

A filter element for 532 nm radiation is made. It includes, in mole percent, the following constituents: 36% $Er_2O_3$, 23.0% $SiO_2$, 25.0% $B_2O_3$, 11.0% $Al_2O_3$ and 5.0% $ZrO_2$. The composition has an optical density of 4.0 at 2.3 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 48.6 | 44.7 | 43.3 | 41.8 | 52.3 | 56.2 | 41.6 | 36.3 |
| $Y_{AR}$ (%) | 56.1 | 51.6 | 50.0 | 48.3 | 60.3 | 64.9 | 48.0 | 41.9 |

EXAMPLE II

A filter element for 532 nm radiation is produced. It incorporates, in mole percent, the following constituents: 34.0% $Nd_2O_3$, 26.0% $SiO_2$, 26.0% $B_2O_3$, 11.0% $Al_2O_3$ and 3.0% $ZrO_2$. The composition has an optical density of 4.0 at 1.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 20.1 | 19.0 | 21.7 | 18.2 | 17.5 | 17.5 | 19.6 | 33.5 |
| $Y_{AR}$ (%) | 23.2 | 21.9 | 25.0 | 21.0 | 20.2 | 20.2 | 22.6 | 38.6 |

EXAMPLE III

A filter element for 1064 nm radiation is made. It includes, in mole percent, the following constituents: 35% $Dy_2O_3$, 24.0% $SiO_2$, 24.0% $B_2O_3$, 15.0% $Al_2O_3$ and 2.0% $ZrO_2$. The filter has an optical density of 4.0 at 2.2 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 81.1 | 79.7 | 79.3 | 79.1 | 80.7 | 81.3 | 79.3 | 79.9 |
| $Y_{AR}$ (%) | 93.6 | 92.0 | 91.5 | 91.3 | 93.1 | 93.8 | 91.6 | 92.3 |

EXAMPLE IV

A filter element for 1064 nm radiation is made. It includes, in mole percent, the following: 35% $Sm_2O_3$, 24.0% $SiO_2$, 24.0% $B_2O_3$, 15.0% $Al_2O_3$ and 2.0% $ZrO_2$. The filter has an optical density of 4.0 at 1.8 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 78.5 | 76.0 | 75.6 | 75.1 | 77.6 | 78.6 | 75.7 | 79.1 |
| $Y_{AR}$ (%) | 90.7 | 87.7 | 87.2 | 86.6 | 89.5 | 90.7 | 87.4 | 91.3 |

EXAMPLE V

A filter element for 532 nm and 1064 nm radiation is made. It includes, in mole percent, the following: 36% $Er_2O_3$, 23.0% $SiO_2$, 25.0% $B_2O_3$, 11.0% $Al_2O_3$ and 5.0% $ZrO_2$, plus a broad-band interference coating to absorb at 1064 nm. The filter has an optical density of 4.0 at 2.3 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 48.6 | 44.7 | 43.3 | 41.8 | 52.3 | 56.2 | 41.6 | 36.3 |
| $Y_{AR}$ (%) | 56.1 | 51.6 | 50.0 | 48.3 | 60.3 | 64.9 | 48.0 | 41.9 |

EXAMPLE VI

A filter element for 532 nm and 1064 nm radiation is made. It includes, in mole percent, the following: 36.0% $Er_2O_3$, 23.0% $SiO_2$, 25.0% $B_2O_3$, 11.0% $Al_2O_3$, 5.0% $ZrO_2$ and was laminated to ferrous oxide containing phosphate glass to absorb at 1064 nm. The filter has an optical density of 4.0 at 5.3 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 47.3 | 42.8 | 40.9 | 40.0 | 50.3 | 54.1 | 39.9 | 34.0 |
| $Y_{AR}$ (%) | 49.4 | 44.6 | 42.7 | 41.8 | 52.5 | 56.4 | 41.6 | 35.4 |

EXAMPLE VII

A filter element for 532 nm and 1064 nm radiation is made. It includes, in mole percent, the following: 32.7% $Er_2O_3$ with ferrous iron (2.3% $Fe_2O_3$), 24.6% $SiO_2$, 22.8% $B_2O_3$, 13.0% $Al_2O_3$, 3.5% $ZrO_2$, 1.0% ZnO. The filter has an optical density of 4.0 at 2.3 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 20.4 | 19.0 | 17.9 | 18.0 | 22.5 | 23.9 | 18.0 | 14.3 |
| $Y_{AR}$ (%) | 23.5 | 21.9 | 20.6 | 20.8 | 25.9 | 27.6 | 20.7 | 16.5 |

Example VIII

A filter element for 532 nm and 1064 nm radiation is made. It includes, in mole percent, the following: 34.0% $Nd_2O_3$, 26.0% $SiO_2$, 26.0% $B_2O_3$, 11.0% $Al_2O_3$, 3.0% $ZrO_2$ and a broad-band interference coating to absorb at 1064 nm gives an optical density of 4.0 at 1.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 20.1 | 19.0 | 21.7 | 18.2 | 17.5 | 17.5 | 19.6 | 33.5 |
| $Y_{AR}$ (%) | 23.2 | 21.9 | 25.0 | 21.0 | 20.2 | 20.2 | 22.6 | 38.6 |

EXAMPLE IX

A filter element for 532 nm and 1064 nm radiation is made. It includes, in mole percent, the following: 34% $Nd_2O_3$, 26.0% $SiO_2$, 26.0% $B_2O_3$, 11.0% $Al_2O_3$, 3.0% $ZrO_2$ and laminated to ferrous oxide containing phosphate glass to absorb at 1064 nm. The filter has an optical density of 4.0 at 4.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 18.6 | 17.6 | 19.7 | 17.0 | 16.7 | 16.6 | 18.5 | 32.0 |
| $Y_{AR}$ (%) | 19.4 | 18.3 | 20.5 | 17.7 | 17.4 | 17.3 | 19.3 | 33.4 |

EXAMPLE X

A filter element for 532 nm and 1064 nm radiation is made. It includes, in mole percent, the following: 36% $Er_2O_3$, 23.0% $SiO_2$, 25.0 $B_2O_3$, 11.0% $Al_2O_3$, 5.0% $ZrO_2$ and laminated to a glass that contained, as expressed in mole percent, the following: 35% $Dy_2O_3$, 24.0% $SiO_2$, 24.0% $B_2O_3$, 15.0% $Al_2O_3$, 2.0% $ZrO_2$; with an anti-reflective coating. The filter has an optical density of 4.0 at 4.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| $Y_{AR}$ (%) | 56.0 | 49.8 | 48.0 | 46.3 | 58.5 | 63.0 | 46.2 | 40.7 |

EXAMPLE XI

A filter element for 532 nm and 1064 nm radiation is made. It includes, in mole percent, the following: 20% $Er_2O_3$ 15.5% $Dy_2O_3$, 23.0% $SiO_2$, 25.0% $B_2O_3$, 12.0% $Al_2O_3$, 4.5% $ZrO_2$ and 0.1% CuO [wt. %]. The filter has an optical density of 4.0 at 4.5 mm thickness, and is color corrected for source $F_3$. This filter has the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 29.6 | 26.8 | 24.3 | 25.0 | 32.6 | 35.1 | 25.1 | 20.2 |
| $Y_{AR}$ (%) | 34.1 | 30.9 | 28.0 | 28.9 | 37.6 | 40.5 | 28.9 | 23.3 |

EXAMPLE XII

A filter element for 532 nm and 1064 nm radiation is made. It includes, in mole percent, the following: 36.0% $Er_2O_3$, 23.0% $SiO_2$, 25.0% $B_2O_3$, 11.0% $Al_2O_3$ and 5.0% $ZrO_2$, laminated to a glass containing 35.0% $Sm_2O_3$, 24.0% $SiO_2$, 24.0% $B_2O_3$, 15.0% $Al_2O_3$ and 2.0 $ZrO_2$%, with an anti-reflective coating. The filter has an optical density of 4.0 at 4.1 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| $Y_{AR}$ (%) | 53.3 | 46.7 | 44.9 | 43.1 | 55.1 | 59.7 | 43.1 | 39.5 |

EXAMPLE XIII

A filter element for 532 nm and 1064 nm radiation is made. It includes, in mole percent, the following: 34.0% $Nd_2O_3$, 26.0% $SiO_2$, 26.0% $B_2O_3$, 11.0% $Al_2O_3$ and 3.0% $ZrO_2$, laminated to a glass containing 35.0% $Dy_2O_3$, 24.0% $SiO_2$, 24.0% $B_2O_3$, 15.0% $Al_2O_3$ and 2.0% $ZrO_2$, with an anti-reflective coating. It has an optical density of 4.0 at 3.7 mm thickness. This filter is color balanced for all fluorescent sources without the addition of additional colorants and has the following luminous transmission.

| SOURCE | A | B | C | $D_{65}$ | $F_2$ | $F_3$ | $F_7$ | $F_{11}$ |
|---|---|---|---|---|---|---|---|---|
| $Y_{AR}$ (%) | 23.1 | 20.8 | 23.8 | 19.8 | 19.2 | 19.3 | 21.4 | 37.0 |

EXHIBIT XIV

A filter element for 532 nm and 1064 nm radiation is made. It includes, in mole percent, the following: 14% $Nd_2O_3$ incorporated with 22% $Dy_2O_3$, 25.0% $SiO_2$, 23.0% $B_2O_3$, 13.0% $Al_2O_3$, 3.0% $ZrO_2$, 0.029 CuO [wt. %]. It has an optical density of 4.0 at 4.5 mm thickness and is color balanced for all fluorescent sources. This filter has the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 14.5 | 13.7 | 15.3 | 13.2 | 13.3 | 13.2 | 14.6 | 25.4 |
| $Y_{AR}$ (%) | | | | | | | | |

EXAMPLE XV

A filter element for 532 nm and 1064 nm radiation is made. It includes, in mole percent, the following: 34.0% $Nd_2O_3$, 26.0% $SiO_2$, 26.0% $B_2O_3$, 11.0% $Al_2O_3$, and 3.0% $ZrO_2$, laminated to a glass containing, in mole percent, 35% $Sm_2O_3$, 24.0% $SiO_2$, 24.0% $B_2O_3$, 15.0% $Al_2O_3$ and 2.0% $ZrO_2$, with an anti-reflective coating. It has an optical density of 4.0 at 3.3 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| $Y_{AR}$ (%) | 22.1 | 19.4 | 22.2 | 18.2 | 18.0 | 18.3 | 19.8 | 35.5 |

EXAMPLE XVI

A filter element for 532 nm radiation was made. It includes, in mole percent, the following: 35% $Er_2O_3$, 25.0% $SiO_2$, 23.0% $B_2O_3$, 13.0% $Al_2O_3$, 3.0% $ZrO_2$ and 1.0% ZnO. It has an optical density of 4.0 at 2.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 50.9 | 45.4 | 44.0 | 42.4 | 53.1 | 57.2 | 42.2 | 36.9 |

EXAMPLE XVII

A filter element for 532 nm and 1064 nm radiation. It includes, in mole percent, the following: 13% $Nd_2O_3$ incorporated with 21% $Dy_2O_3$, 25.25% $SiO_2$, 22.75% $B_2O_3$, 14.0% $Al_2O_3$, 3.0% $ZrO_2$ and 1.0% ZnO. The filter has an optical density of 4.0 at 4.0 mm thickness, and is color corrected for all fluorescent sources. This filter has the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 20.3 | 18.5 | 20.8 | 17.6 | 17.5 | 17.7 | 18.7 | 29.4 |

EXAMPLE XVIII

A filter element for 532 nm radiation was made. It includes, in mole percent, the following: 34% $Nd_2O_3$, 25.25% $SiO_2$, 22.75% $B_2O_3$, 14.0% $Al_2O_3$, 3.0% $ZrO_2$ and 1.0% ZnO. The filter has an optical density of 4.0 at 1.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 20.3 | 18.7 | 21.2 | 17.9 | 17.5 | 17.6 | 19.0 | 30.2 |

EXAMPLE XIX

A filter element for 1064 nm radiation is made. It includes, in mole percent, the following: 33.0% $Dy_2O_3$, 25.5% $SiO_2$, 23.5% $B_2O_3$, 14.0% $Al_2O_3$, 3.0% $ZrO_2$ and 1.0% ZnO. The filter has an optical density of 4.0 at 2.5 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 84.4 | 83.2 | 82.9 | 82.7 | 83.9 | 84.5 | 82.9 | 83.5 |

EXAMPLE XX

A filter element for 1064 nm radiation is made. It includes, in mole percent, the following: 34.0% $Sm_2O_3$, 25.25% $SiO_2$, 22.75% $B_2O_3$, 14.0% $Al_2O_3$, 3.0% $ZrO_2$ and 1.0% ZnO. The filter has an optical density of 4.0 at 1.8 mm thickness, with the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 79.9 | 77.6 | 77.1 | 76.7 | 79.0 | 80.0 | 77.3 | 80.3 |

EXAMPLE XXI

A filter element for 532 nm and 1064 nm radiation is made. It includes, in mole percent, the following: 16.8% $Nd_2O_3$ incorporated with 15.8% $Sm_2O_3$, 26.0% $SiO_2$, 22.4% $B_2O_3$, 15.2% $Al_2O_3$, 3.0% $ZrO_2$ and 1.0% ZnO. The filter has an optical density of 4.0 at approximately 3.0 mm thickness, and is color balanced for all fluorescent sources. This filter has the following luminous transmission.

| SOURCE | A | B | C | $D_{65}$ | $F_2$ | $F_3$ | $F_7$ | $F_{11}$ |
|---|---|---|---|---|---|---|---|---|
| Y (%) | 20.2 | 18.1 | 20.4 | 17.1 | 17.2 | 17.5 | 18.2 | 28.4 |

EXAMPLE XXII

A filter element for 532 nm is made. It includes, in mole percent, the following: 31.0% $Er_2O_3$, 21.5% $SiO_2$, 22.5% $B_2O_3$, 5.0% $ZrO_2$, 5% $Y_2O_3$ and 15% $Al_2O_3$.

EXAMPLE XXIII

A filter element for 532 nm is made. It includes, in mole percent, the following: 30.0% $Er_2O_3$, 22.5% $SiO_2$, 22.5% $B_2O_3$, 5.0% $ZrO_2$, 5.0% $Y_2O_3$ and 15% $Al_2O_3$.

EXAMPLE XXIV

A filter element for 532 nm is made. It includes, in mole percent, the following: 25.0% $Er_2O_3$, 20.0% $SiO_2$, 20.0% $B_2O_3$, 7.0% $Zr_2O_3$, 7.0% $Y_2O_3$ and 21.0% $Al_2O_3$.

EXAMPLE XXV

A filter element for 532 nm is made. It includes, in mole percent, the following: 28.0% $Er_2O_3$, 31.0% $SiO_2$, 21.0% $B_2O_3$, 5.0% $Zr_2O_3$ and 15.0% $Al_2O_3$.

EXAMPLE XXVI

A filter element for 532 nm is made. It includes, in mole percent, the following: 32.0% $Er_2O_3$, 26.0% $SiO_2$, 26.0% $B_2O_3$, 4.0% $ZrO_2$ and 12.0% $Al_2O_3$.

EXAMPLE XXVII

A filter element for 532 nm is made. It includes, in mole percent, the following: 34.0% $Er_2O_3$, 26.0% $SiO_2$, 26.0% $B_2O_3$, 3.0% $ZrO_2$ and 11.0% $Al_2O_3$.

EXAMPLE XXVIII

A filter element for 532 nm is made. It includes, in mole percent, the following: 3.60% $Er_2O_3$, 26.0% $SiO_2$, 26.0% $B_2O_3$, 2.0% $ZrO_2$ and 10.0% $Al_2O_3$.

EXAMPLE XXIX

A filter element for 532 nm is made. It includes, in mole percent, the following: 34.0% $Nd_2O_3$, 26.0% $SiO_2$, 26.0% $B_2O_3$, 3.0% $ZrO_2$ and 11.0% $Al_2O_3$.

EXAMPLE XXX

A filter element for 532 nm is made. It includes, in mole percent, the following: 33.0% $Nd_2O_3$, 25.0% $SiO_2$, 25.0% $B_2O_3$, 3.0% $ZrO_2$ and 14.0% $Al_2O_3$.

EXAMPLE XXXI

A filter element for 532 nm is made. It includes, in mole percent, the following: 35.0% $Nd_2O_3$, 24.0% $SiO_2$, 22.0% $B_2O_3$, 3.0% $ZrO_2$ and 16.0% $Al_2O_3$.

EXAMPLE XXXII

A filter element for 532 nm is made. It includes, in mole percent, the following: 28.0% $Nd_2O_3$, 25.0% $SiO_2$, 25.0% $B_2O_3$, 3.0% $ZrO_2$, 14.0% $Al_2O_3$ and 5.0% $Pr_{23}$.

EXAMPLE XXXIII

A filter element for 532 nm is made. It includes, in mole percent, the following: 30.0% $Nd_2O_3$, 25.0% $SiO_2$, 25.0% $B_2O_3$, 3.0% $ZrO_2$, 14.0% $Al_2O_3$ and 3.0% $Pr_2O_3$.

EXAMPLE XXXIV

A filter element for 532 nm is made. It includes, in mole percent, the following: 33.0% $Er_2O_3$, 25.5% $SiO_2$, 25.5% $B_2O_3$, 3.0% $ZrO_2$, 12.0% $Al_2O_3$ and 1.0% $Pr_2O_3$.

EXAMPLE XXXV

A filter element for 532 nm is made. It includes, in mole percent, the following: 32.3% $Er_2O_3$, 25.3% $SiO_2$, 25.3% $B_2O_3$, 3.0% $ZrO_2$, 12.1% $Al_2O_3$ and 0.64% $Pr_2O_3$.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A filter element consisting essentially of, in mole percent, 19–31% $SiO_2$, 19–31% $B_2O_3$, 10–20% $Al_2O_3$, 2–10% $ZrO_2$, 0–10% $Y_2O_3$, and 25–39% of one or more rare earth oxides selected from the group $Er_2O_3$, $Nd_2O_3$, $Dy_2O_3$, $Sm_2O_3$, $Ce_2O_3$, $Pr_2O_3$, $Ho_2O_3$, $Yb_2O_3$ and $Tm_2O_3$.

2. The filter element of claim 1, wherein the rare earth oxides are selected from the group $Er_2O_3$, $Nd_2O_3$, $DY_2O_3$ and $Sm_2O_3$.

3. The filter element of claim 1, wherein the ratio of $SiO_2$ to $B_2O_3$ is about 0.8 to 1.4.

4. The filter element of claim 1, wherein the amount of $SiO_2$ and $B_2O_3$ is greater than about 40%.

5. The filter element of claim 1, wherein the amount of $Al_2O_3$, $ZrO_2$ and $Y_2O_3$ is greater than about 12%.

6. The filter element of claim 1 and further including one or more color correction oxides in an amount sufficient to provide a neutral glass, selected from the group consisting of $Cr_2O_3$, $Pr_2O_3$, $Fe_2O_3$, CuO, NiO, $V_2O_5$, $Co_3O_4$ and $Ti_2O_3$.

7. The filter element of claim 6, wherein the color correction oxide is $Pr_2O_3$.

8. The filter element of claim 1, wherein the filter is an absorption filter for 532 nm.

9. The filter element of claim 8, wherein the filter has an optical density of about 3.0 to 6.0.

10. The filter element of claim 8, wherein the filter has a thickness of about 1.5 to 5.5 mm.

11. The filter element of claim 1, wherein the filter is an absorption filter for 1064 nm.

12. The filter element of claim 11, wherein the filter has an optical density of about 3.0 to 6.0.

13. The filter element of claim 11, wherein the filter has a thickness of about 1.5 to 5.5 mm.

14. The filter element of claim 1, wherein the filter is an absorption filter for 532 nm and 1064 nm.

15. The filter element of claim 14, wherein the filter has an optical density of about 3.0 to 6.0 mm.

16. The filter element of claim 14, wherein the filter has a thickness of about 1.5 to 5.5 mm.

17. The filter element of claim 1, wherein the amount of rare earth oxides is greater than about 30 and but no greater than 39 mole percent.

18. The filter element of claim 1, further including FeO in an amount of about 0.1 to 5.0 mole percent, and ZnO in an amount of about 0.1 to 5.0 mole percent.

19. The filter element of claim 1, wherein the rare earth oxide is $Er_2O_3$, and the resulting filter has a luminous transmission of greater than about 50%.

20. The filter element of claim 1, wherein the rare earth oxide is either $Dy_2O_3$ or $Sm_2O_3$, and the resulting filter has a luminous transmission of greater than about 75%.

21. The filter element of claim 1, wherein the rare earth oxide is $Nd_2O_3$, and the resulting filter has a luminous transmission of greater than about 25%.

22. The filter element of claim 1, wherein the rare earth oxides are $Er_2O_3$ and $Dy_2O_3$.

23. The filter element of claim 1, wherein the rare earth oxides are $Er_2O_3$ and $Sm_2O_3$.

24. The filter element of claim 1, wherein the rare earth oxides are $Er_2O_3$ and $Nd_2O_3$.

25. The filter element of claim 1, wherein the rare earth oxides are $Nd_2O_3$ and $Dy_2O_3$.

26. A glass composition consisting essentially of, by mole percent, 19-31% $SiO_2$, 19-31% $B_2O_3$, 10-20% $Al_2O_3$, 2-10% $ZrO_2$, 0-10% $Y_2O_3$, and 25-39% of one or more rare earth oxides selected from the group $Er_2O_3$, $Nd_2O_3$, $Dy_2O_3$, $Sm_2O_3$, $Ce_2O_3$, $Pr_2O_3$, $Ho_2O_3$, $Tm_2O_3$, $La_2O_3$, $Gd_2O_3$ and $Yb_2O_3$.

27. The glass composition of claim 26, wherein the rare earth oxides are selected from the group $Er_2O_3$, $Nd_2O_3$, $Dy_2O_3$ and $Sm_2O_3$.

28. The glass composition of claim 26, wherein the ratio of $SiO_2$ to $B_2O_3$ is about 0.8 to 1.4.

29. The glass composition of claim 26, where the amount of $SiO_2$ and $B_2O_3$ are greater than about 40%.

30. The glass composition of claim 26, wherein the amount of $Al_2O_3$, $ZrO_2$ and $Y_2O_3$ are greater than about 12%.

31. The glass composition of claim 26, further including one or more color correction oxides in an amount sufficient to provide a neutral glass, selected from the group consisting of $Cr_2O_3$, $Pr_2O_3$, $Fe_2O_3$, $CuO$, $NiO$, $V_2O_5$, $Co_3O_4$ and $Ti_2O_3$.

32. The glass composition of claim 31, wherein the color correction oxide is $Pr_2O_3$.

33. The glass composition of claim 26, wherein the mole percent of rare earth oxides is about 31-39%.

34. The glass composition of claim 26, further including 0.1 to 5.0 mole percent FeO, and 0.1 to 5.0 mole percent ZnO.

35. The glass composition of claim 26, wherein the rare earth oxides are $Er_2O_3$ and $Dy_2O_3$.

36. The glass composition of claim 26, wherein the rare earth oxides are $Er_2O_3$ and $Sm_2O_3$.

37. The glass composition of claim 26, wherein the rare earth oxides are $Er_2O_3$ and $Nd_2O_3$.

38. The glass composition of claim 26, wherein the rare earth oxides are $Nd_2O_3$ and $Dy_2O_3$.

39. The filter element of claim 1, wherein the rare earth oxides are selected from the group $Er_2O_3$, $Nd_2O_3$, $Dy_2O_3$, $Sm_2O_3$, $Ce_2O_3$, $Pr_2O_3$, and $Ho_2O_3$.

40. The glass composition of claim 26, wherein the rare earth oxides are selected from the group $Er_2O_3$, $Nd_2O_3$, $Dy_2O_3$, $Sm_2O_3$, $Ce_2O_3$, $Pr_2O_3$, and $Ho_2O_3$.

* * * * *